US012476036B2

(12) United States Patent
Kim

(10) Patent No.: US 12,476,036 B2
(45) Date of Patent: Nov. 18, 2025

(54) COIL APPARATUS

(71) Applicant: STEMCO CO., LTD., Cheongju-si (KR)

(72) Inventor: Kang Dong Kim, Seongnam-si (KR)

(73) Assignee: STEMCO CO., LTD., Cheongju-si (KR)

( * ) Notice: Subject to any disclaimer, the term of this patent is extended or adjusted under 35 U.S.C. 154(b) by 989 days.

(21) Appl. No.: 17/561,550

(22) Filed: Dec. 23, 2021

(65) Prior Publication Data

US 2022/0122758 A1 Apr. 21, 2022

Related U.S. Application Data

(63) Continuation of application No. PCT/KR2020/011001, filed on Aug. 19, 2020.

(30) Foreign Application Priority Data

Aug. 20, 2019 (KR) ........................ 10-2019-0101718
Aug. 19, 2020 (KR) ........................ 10-2020-0103807

(51) Int. Cl.
*H01F 27/28* (2006.01)
*H01F 27/29* (2006.01)
*H01F 41/04* (2006.01)

(52) U.S. Cl.
CPC ......... *H01F 27/2804* (2013.01); *H01F 27/29* (2013.01); *H01F 41/041* (2013.01); *H01F 2027/2809* (2013.01)

(58) Field of Classification Search
CPC ................. H01F 27/2804; H01F 27/29; H01F 2027/2809; H01F 5/003; H01F 17/0006; H01F 2017/0073

(Continued)

(56) References Cited

U.S. PATENT DOCUMENTS 4,313,152 A * 1/1982 Vranken ............. H01F 17/0006 336/200
5,376,774 A * 12/1994 McGaffigan ......... H05B 6/1245 336/232
5,572,179 A * 11/1996 Ito ....................... H01F 17/0006 336/200
7,870,665 B2 * 1/2011 Nomura ................ H05K 3/242 336/200

(Continued)

FOREIGN PATENT DOCUMENTS

CN 203056092 U * 7/2013
CN 104064874 A * 9/2014

(Continued)

OTHER PUBLICATIONS

International Search Report issued in PCT/KR2020/011001; mailed Nov. 19, 2020.

(Continued)

*Primary Examiner* — Mang Tin Bik Lian
*Assistant Examiner* — Joselito S. Baisa
(74) *Attorney, Agent, or Firm* — Studebaker Brackett PLLC

(57) ABSTRACT

Provided is a coil apparatus having a plurality of coil patterns formed on one surface. The coil apparatus comprises at least one coil substrate, wherein the coil substrate comprises a base layer, and a coil pattern formed on the base layer and including a pattern portion, a via portion part or an external electrode portion, and a coil substrate, wherein the coil substrate is wound in a multi-helical structure in response to a plurality of coil patterns being provided.

7 Claims, 7 Drawing Sheets

(58) Field of Classification Search
USPC .................................................. 336/177, 200
See application file for complete search history.

(56) References Cited

U.S. PATENT DOCUMENTS

| | | | | |
|---|---|---|---|---|
| 8,471,358 | B2 * | 6/2013 | Yen | H01L 23/49822 257/E29.325 |
| 9,576,711 | B2 | 2/2017 | Yoon et al. | |
| 9,843,216 | B2 | 12/2017 | Ookawa et al. | |
| 10,283,257 | B2 * | 5/2019 | Kim | H01F 27/2804 |
| 11,574,760 | B2 * | 2/2023 | Acar | H01F 41/041 |
| 2011/0050380 | A1 * | 3/2011 | Nakanishi | H01F 27/341 336/200 |
| 2016/0049237 | A1 * | 2/2016 | Yosui | H01F 27/2804 336/200 |
| 2017/0117079 | A1 * | 4/2017 | Yen | H01F 27/2804 |
| 2019/0304670 | A1 * | 10/2019 | Chiyo | H01F 27/2804 |

FOREIGN PATENT DOCUMENTS

| | | | | | |
|---|---|---|---|---|---|
| CN | 204480837 | U | | 7/2015 | |
| DE | 4137043 | C1 | * | 4/1993 | G06F 21/86 |
| JP | H11-307367 | A | | 11/1999 | |
| JP | 2001512626 | A | * | 8/2001 | H01F 5/003 |
| JP | 2014-222707 | A | | 11/2014 | |
| JP | 2018-166160 | A | | 10/2018 | |
| KR | 10-2013-0077400 | A | | 7/2013 | |
| KR | 10-2014-0023141 | A | | 2/2014 | |
| KR | 10-2016-0032580 | A | | 3/2016 | |
| TW | 201312604 | A | * | 3/2013 | |

OTHER PUBLICATIONS

Office Action issued in KR 10-2020-0103807; mailed by the Korean Intellectual Property Office on Jul. 20, 2021.

Office Action issued in TW 109128429; mailed by the Taiwan Intellectual Property Office on Apr. 15, 2021.

An Office Action mailed by the Korean Intellectual Property Office on Sep. 11, 2023, which corresponds to Korean Patent Application No. 10-2023-0015398 and is related to U.S. Appl. No. 17/561,550.

A Notice of Allowance mailed by the Korean Intellectual Property Office on Nov. 29, 2023, which corresponds to Korean Patent Application No. 10-2023-0015398 and is related to U.S. Appl. No. 17/561,550.

* cited by examiner

COIL APPARATUS

This application claims the benefit of Korean Patent Application No. 10-2019-0101718, filed on Aug. 20, 2019 and No. 10-2020-0103807, filed on Aug. 19, 2020, in the Korean Intellectual Property Office, the disclosure of which is incorporated herein by reference in its entirety.

BACKGROUND

1. Field

The present invention relates to a coil apparatus. More particularly, it relates to a thin-film coil apparatus.

2. Description of the Related Art

With the advent of small electronic products such as smartphones and digital cameras, various electronic components embedded in small electronic products are also becoming smaller. In the case of coil parts, thin-film coil parts, in which copper is electrolytically plated and patterned, are in the spotlight in recent years from the winding type, to which copper wire is applied.

Thin-film coil parts are electronic parts used for noise removal and focus correction in various electronic devices. In order to secure sufficient electromagnetic force, a method such as extending the thickness of a coil pattern or forming a coil pattern in multiple layers may be adopted.

SUMMARY

However, when the coil pattern is formed in multiple layers, the following problems may occur in the coil part.

First, when the coil pattern is formed as a multi-layer of three or more layers, since a plurality of processes such as interlayer insulating layer formation, via hole formation, and deposition film formation are additionally required, the productivity of the coil part may be reduced.

Second, when the coil pattern is formed in multiple layers, when the coil pattern of the upper layer is wound from the outside to the inside, the coil pattern of the lower layer is wound in the opposite direction. For example, when the coil part 100 is composed of three layers such as the L1 layer 110, the L2 layer 120, and the L3 layer 130, the first coil pattern 111 of the L1 layer 110, the second coil pattern 121 of the L2 layer 120, and the third coil pattern 131 of the L3 layer 130 are wound as shown in FIG. 1 and electrically connected through a via hole.

However, when the multi-layered coil pattern is wound and electrically connected in the same manner as described above, one of the positive terminal 140 and the negative terminal 150 is located on the winding core side (inside) of the coil, so that connections between the coil part and the outside power supply can be difficult.

Third, when the coil pattern is formed in multiple layers, the interlayer insulating layer that separates the coil pattern of each layer may not completely block the current, and thus leakage current may occur, and accordingly, the magnetic properties of the coil part may be deteriorated.

Accordingly, an object of the present disclosure is to provide a coil apparatus, in which a plurality of coil patterns are formed on one surface.

Objects of the present disclosure are not limited to the objects mentioned above, and other objects not mentioned will be clearly understood by those skilled in the art from the following description.

One aspect of the coil apparatus of the present disclosure for achieving the above object comprises at least one coil substrate, wherein the coil substrate comprises a base layer; and a coil pattern formed on the base layer and including a pattern portion, a via portion part or an external electrode portion, wherein the coil substrate is wound in a multi-helical structure in response to a plurality of coil patterns being provided.

When a plurality of coil patterns are formed, pattern portions of each coil pattern are spaced apart from each other in parallel so that the plurality of coil patterns do not overlap and the coil substrate may be wound in a multi-helical structure.

Wherein, in response to a first coil pattern and a second coil pattern being formed on the base layer, a pattern portion of the second coil pattern may be spaced parallel to an inside of a pattern portion of the first coil pattern and wound side by side to form a double-helical structure.

Wherein all of the plurality of coil patterns are wound in the same number of turns or at least one different number of turns.

Wherein current flows in all of the plurality of coil patterns in the same direction, or current flows in one or more of the plurality of coil patterns in a different direction.

Wherein a third coil pattern including a pattern portion, a via pad portion or an external electrode portion is further formed on a back surface of the base layer, and one end of the third coil pattern and the other end of may be electrically connected through different coil patterns and vias on a front surface of the base layer.

Wherein the via comprises a first via or a second via, and the first via electrically connects the first coil pattern and the third coil pattern, and the second via electrically connects the second coil pattern and the third coil pattern.

Wherein a plurality of coil substrates are provided and stacked by an interlayer insulating layer or a protective layer formed between the respective coil substrates, and the plurality of coil substrates are electrically connected to each other by a plurality of vias formed in the interlayer insulating layer or the protective layer.

Wherein the plurality of coil substrates comprise a first coil substrate and a second coil substrate, a fourth coil pattern is formed on the second coil substrate, the plurality of vias comprise a third via or a fourth via, the third via may connect the fourth coil pattern and a second coil pattern of the first coil substrate, and the fourth via may connect the fourth coil pattern and an external connection portion of the first coil substrate.

Wherein the third via or the fourth via may be formed passing through two or more interlayer insulating layers, protective layers, or base layers.

Wherein a plurality of external electrode portions are formed on the same layer.

The details of other embodiments are included in the detailed description and drawings.

According to the present disclosure, it is possible to secure a high electromagnetic force while reducing the number of stacked coil patterns, and to provide a thin-film coil apparatus having a high degree of circuit freedom.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
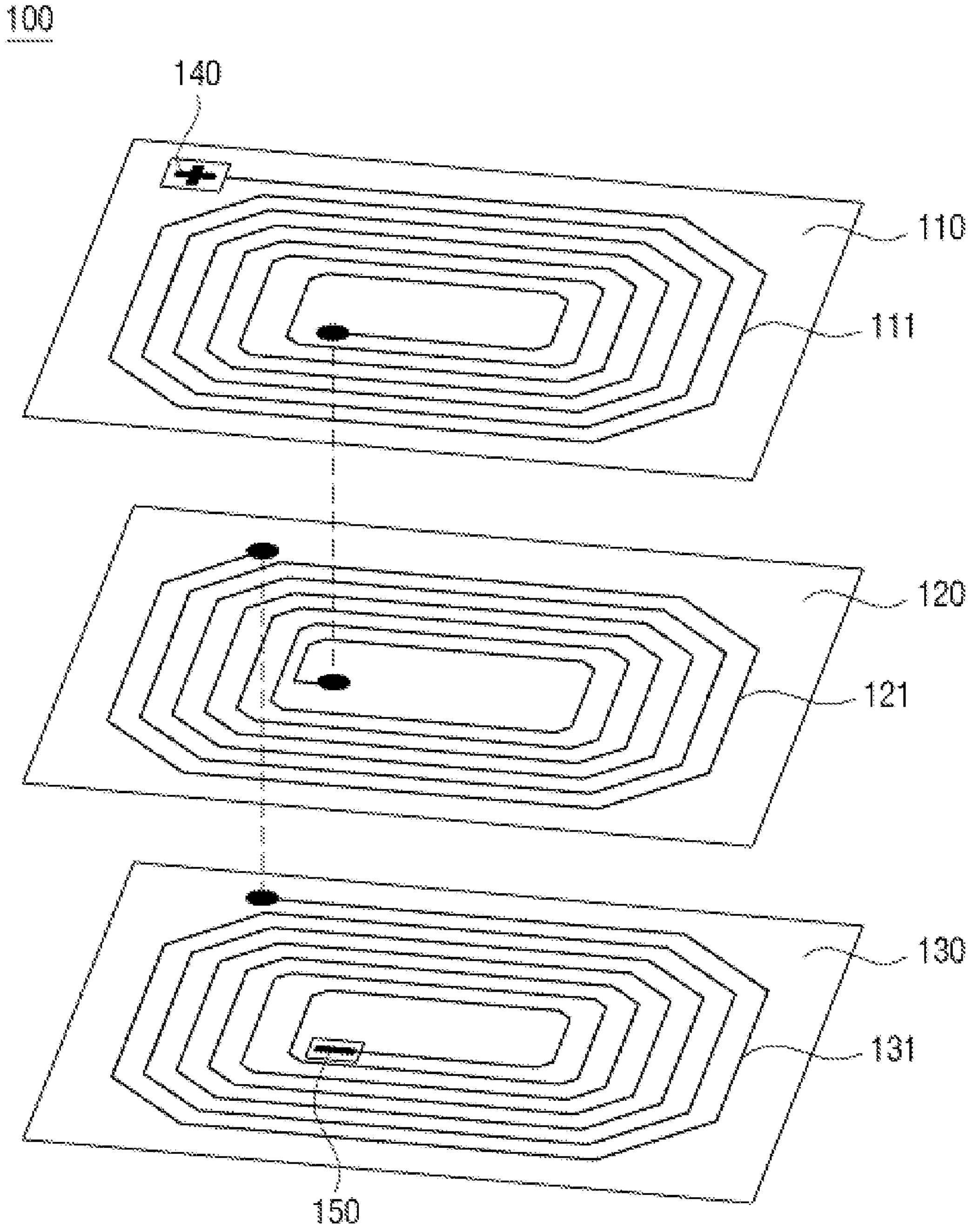
FIG. 1 is a view showing a conventional coil part.

Hereinafter, preferred embodiments of the present invention will be described in detail with reference to the accompanying drawings. Advantages and features of the present invention and methods of achieving them will become apparent with reference to the embodiments described below in detail in conjunction with the accompanying drawings. However, the present invention is not limited to the embodiments described below, but may be implemented in various different forms, and these embodiments are provided only for making the description of the present invention complete and fully informing those skilled in the art to which the present invention pertains on the scope of the invention, and the present invention is only defined by the scope of the claims. Like reference numerals refer to like elements throughout.

When an element or layer is referred as being located "on" another element or layer, it includes not only being located directly on the other element or layer, but also with intervening other layers or elements. On the other hand, when an element is referred as being "directly on" or "immediately on," it indicates that no intervening element or layer is interposed.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present invention.

The terminology used herein is for the purpose of describing the embodiments and is not intended to limit the present disclosure. In the present disclosure, the singular also includes the plural, unless specifically stated otherwise in the phrase. As used herein, "comprises" and/or "comprising" refers to that components, steps, operations and/or elements mentioned does not exclude the presence or addition of one or more other components, steps, operations and/or elements.

Unless otherwise defined, all terms (including technical and scientific terms) used herein may be used with the meaning commonly understood by those of ordinary skill in the art to which the present invention belongs. In addition, terms defined in a commonly used dictionary are not to be interpreted ideally or excessively unless clearly defined in particular.

Hereinafter, embodiments of the present disclosure will be described in detail with reference to the accompanying drawings, and in the description with reference to the accompanying drawings, the same or corresponding components are given the same reference numbers, regardless of reference numerals in drawings, and an overlapped description therewith will be omitted.

An object of the present disclosure is to provide a thin-film coil apparatus capable of securing high electromagnetic force while reducing the number of stacked layers of coil patterns and having a high degree of circuit freedom. Hereinafter, the present disclosure will be described in detail with reference to the drawings.

Figure 2:
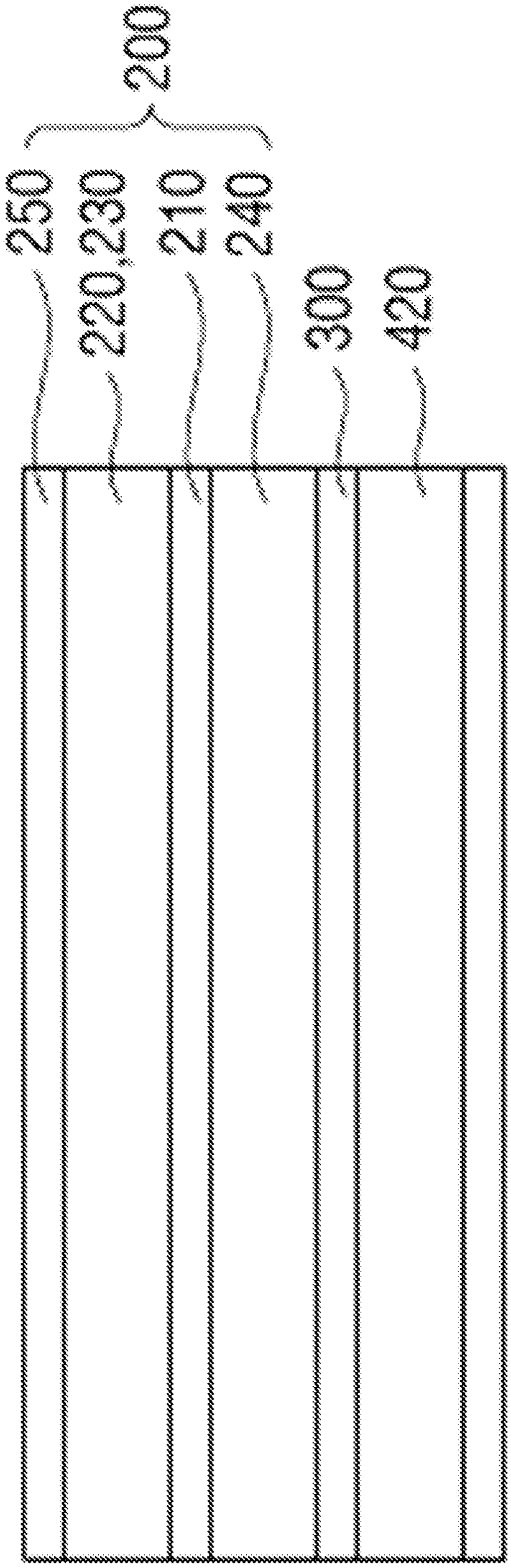
FIG. 2 is a cross-sectional view of a coil apparatus according to an embodiment of the present disclosure.

FIG. 2 is a cross-sectional view of a coil substrate according to an embodiment of the present disclosure.

In this embodiment, the coil substrate may include a base layer, a coil pattern, and a protective layer, and may be applied to electronic parts such as thin-film coil apparatus, inductors, capacitors, and actuators, as well as small electronic products such as smartphones and digital cameras, and various electronic devices such as vibration motors, speakers, antennas, etc.

The coil substrate 200 according to FIG. 2 may include, for example, a first base layer 210, first and second coil patterns 220 and 230, and a protective layer 250.

The first base layer 210 is a base film, and may be formed of a flat film having a predetermined thickness (e.g., 5 μm to 100 μm). The first base layer 210 may be formed in the form of any one of a flexible film, a rigid film, and a rigid flexible film.

The first base layer 210 may be manufactured using at least one material selected from various polymer materials. For example, the first base layer 210 may be manufactured by using at least one material selected from polymer materials such as polyimide, polyethylene terephthalate (PET), polyethylene naphthalate (PEN), poly-carbonate, epoxy, glass fiber, etc.

A seed layer (not shown) or an under layer (not shown) made of a conductive material may be formed on one or both surfaces of the first base layer 210.

The seed layer or the under layer may be formed on the first base layer 210 using at least one metal selected from nickel (Ni), chromium (Cr), copper (Cu), gold (Au), etc. as a conductive material. Such a seed layer or an under layer may be formed on the first base layer 210 by a physical method or a chemical method such as deposition, adhesion, plating, etc. However, the present embodiment is not limited thereto. The first base layer 210 may be formed in the form that does not include a seed layer or an under layer on one surface or both surfaces.

The first coil pattern 220 is for inducing electromagnetic force, and may be formed on one surface of the first base layer 210. The first coil pattern 220 may be formed on one surface of the first base layer 210 using a conductive material as a material. For example, the first coil pattern 220 may be formed on one surface of the first base layer 210 using at least one metal selected from silver (Ag), palladium (Pd), aluminum (Al), nickel (Ni), titanium (Ti), gold (Au), platinum (Pt), copper (Cu), etc.

The first coil pattern 220 may be formed on the first base layer 210 using various techniques such as plating, printing, and coating. For example, when a plating technique is used, the first coil pattern 220 may be formed on the first base layer 210 by using any one of electrolytic plating and electroless plating. In addition, plating may be performed one or more times, and in this case, a plurality of boundary lines may be formed in the cross section of the first coil pattern 220 by the number of plating progress or changing plating conditions.

As an example of the electrolytic plating method, the first coil pattern 220 may be formed on a portion of the first base layer 210 where a resist pattern layer (not shown) is not formed. Here, the resist pattern layer is a resin layer made of an insulating material, and may be formed on the first base layer 210 before the first coil pattern 220. The first coil pattern 220 may be formed on the first base layer 210 with the same thickness as the resist pattern layer, or may be formed on the first base layer 210 with a thinner thickness than the resist pattern layer. When the first coil pattern 220 is formed on the first base layer 210 in this way, it is possible to prevent the plating from being biased on the upper portion, and the upper width and the lower width may be uniformly formed.

Meanwhile, the resist pattern layer may be removed from the first base layer 210 after the first coil pattern 220 is formed in the first base layer 210. For example, the resist pattern layer may be removed from the first base layer 210 after the first coil pattern 220 is formed in the first base layer 210 and before the protective layer 250 is formed on the first coil pattern 220.

Figure 3:
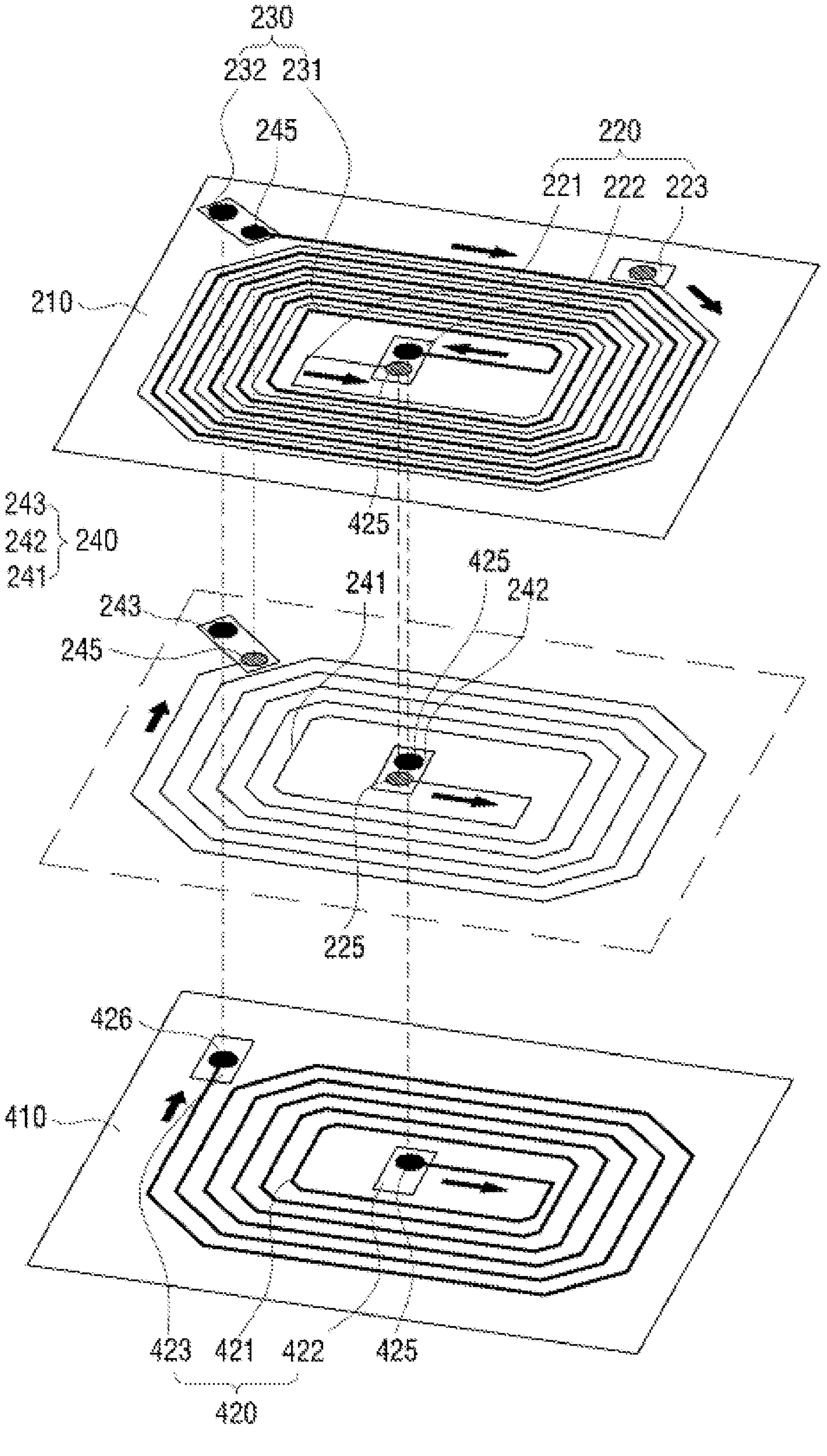
FIG. 3 is an exploded perspective view illustrating a coil pattern constituting a coil substrate according to an embodiment of the present disclosure.

Meanwhile, as shown in FIG. 3, the first coil pattern 220 may be formed to include a first pattern portion 221, a first via pad portion 222, or a first external electrode portion 223.

Figure 4:
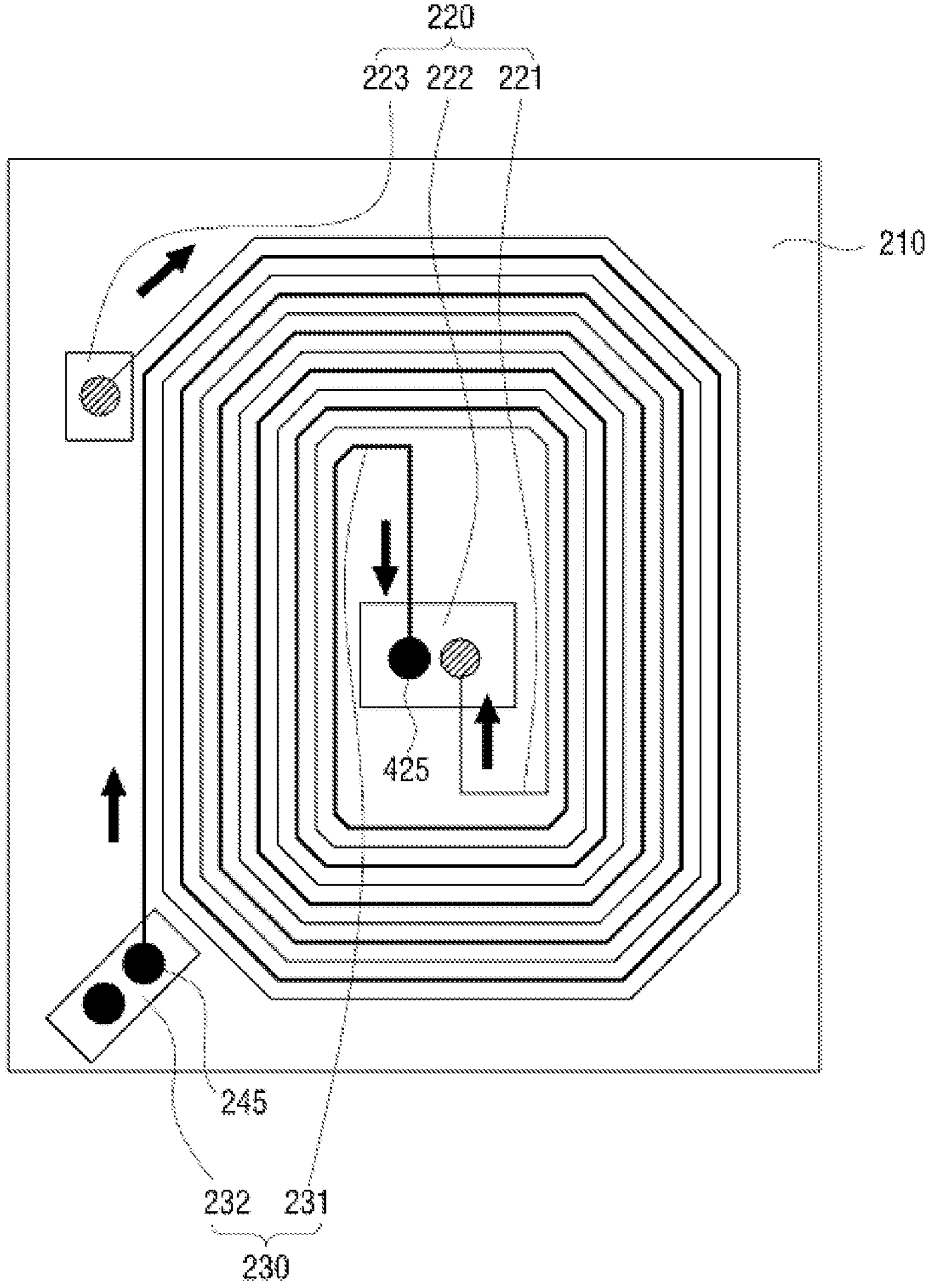
FIGS. 4 to 6 are plan views of each layer for describing a coil pattern constituting a coil substrate according to an embodiment of the present disclosure.
Figure 5:
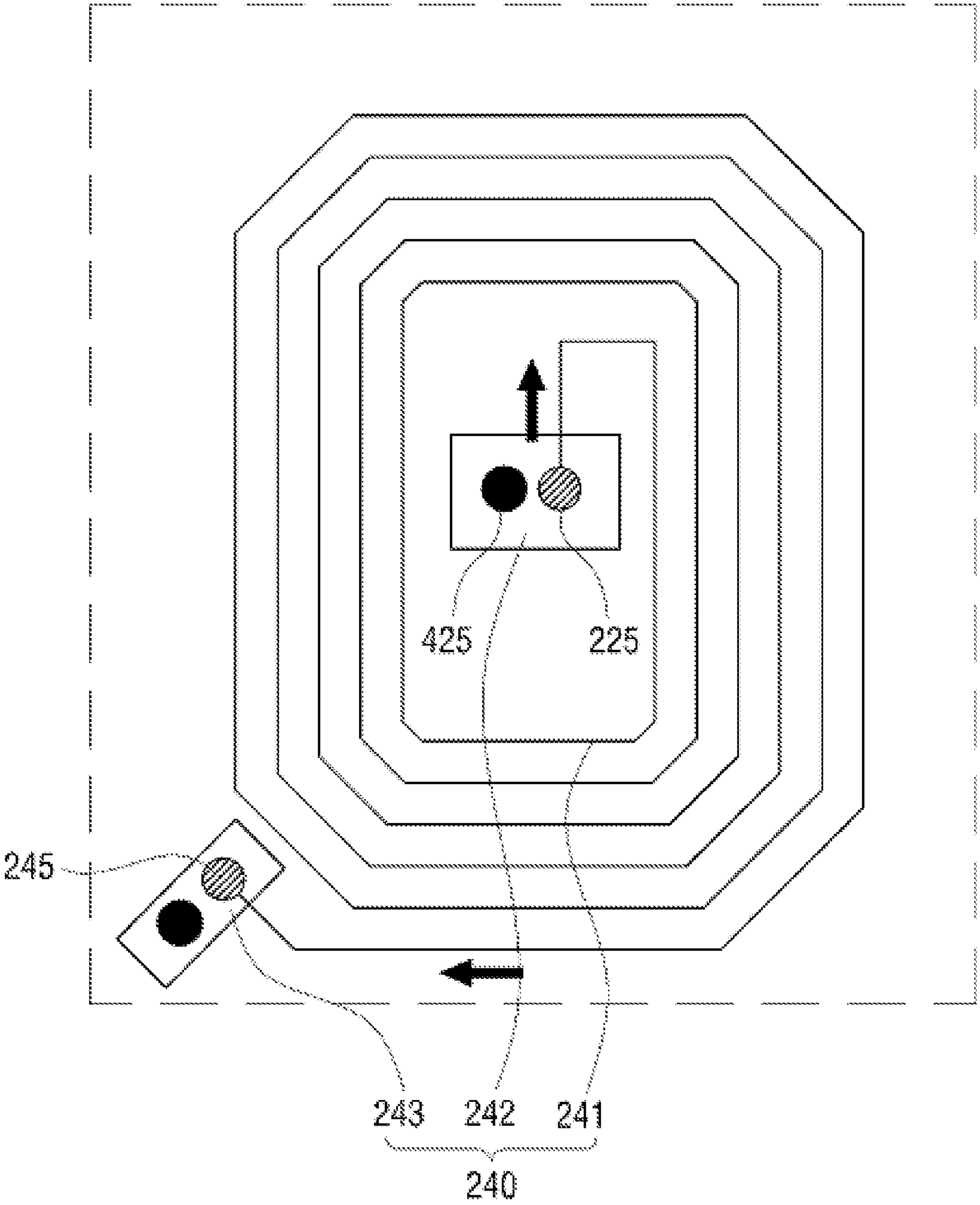
Figure 6:
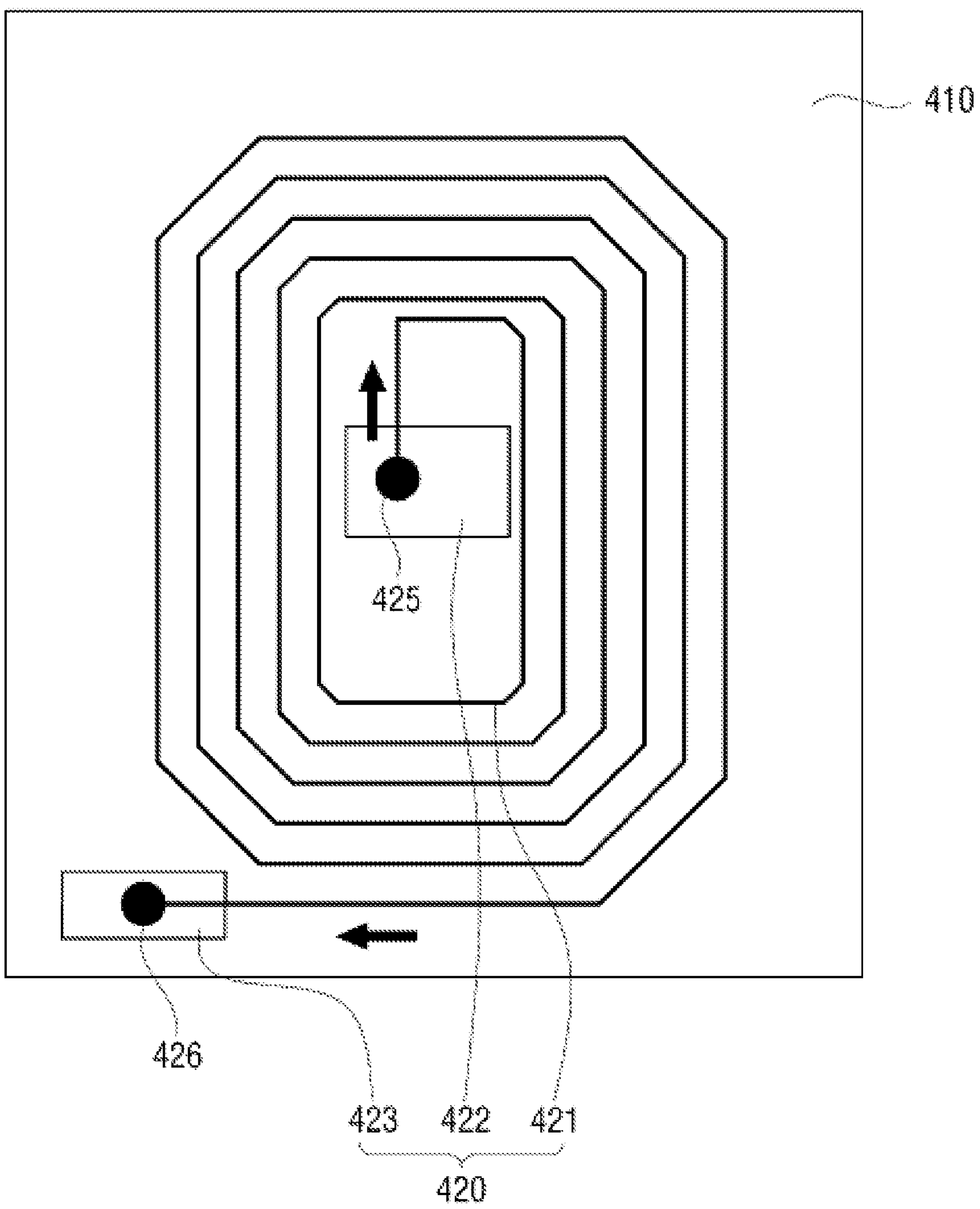

FIG. 3 is an exploded perspective view illustrating a coil pattern constituting a coil substrate according to an embodiment of the present disclosure, and FIGS. 4 to 6 are plan views of each layer illustrating a coil pattern constituting a coil substrate according to an embodiment of the present disclosure. The following description refers to FIGS. 3 to 6.

The first pattern portion 221 of the first coil pattern 220 refers to a pattern formed in the form of a line, and may be formed on the first base layer 210 with the same width as a single continuous line. However, the present embodiment is not limited thereto, and it is also possible that a portion of the continuous line is formed on the first base layer 210 with different widths.

The first via pad portion 222 or the first external electrode portion 223 may be located at one end or the other end of the first coil pattern 220, and may be formed on the first base layer 210 with a wider width than the first pattern portion 221.

Meanwhile, a plurality of first and second coil patterns 220 and 230 may be formed on the first base layer 210, and the plurality of coil patterns may be wound in a multi-helical structure. In the present disclosure, winding in a multi-helical structure is defined as that the pattern portion lines of each coil pattern are spaced apart from each other in parallel so that a plurality of coil patterns do not overlap each other. Referring to FIG. 4, taking an example of the two coil patterns 220 and 230 formed on the first base layer 210, that is, the first coil pattern 220 and the second coil pattern 230, the first pattern portion 221 of the first coil pattern 220 is spaced apart in parallel with the second pattern portion 231 of the second coil pattern 230 at the same distance, and the second pattern portion 231 may be formed on the first base layer 210 so as to be wound side by side to the inside of the first pattern portion 221. That is, in one cross-section perpendicular to the first base layer 210 of the coil substrate 200, first pattern portion 221 and second pattern portion 231 may be alternately formed in a central direction. In this case, when current is applied to the first and second coil patterns 220 and 230, about 1.1 to 2.5 times the electromagnetic force can be secured compared to the case where only the first coil pattern 220 is formed. However, the present embodiment is not limited thereto, and they may be formed on the first base layer 210 to be spaced apart from each other at different distances.

In addition, in the plurality of coil patterns, each coil pattern may be wound with the same number of turns or with at least one different number of turns. This may affect the strength of the electromagnetic force induced in the first coil substrate 200, and in particular, when the number of turns of each coil pattern is the same and current flows in the same direction, the strength of the electromagnetic force may be strong. On the other hand, when current flows in a different direction with respect to one or more coil patterns among the plurality of coil patterns, the electromagnetic force may be offset and the strength may be weakened. In this case, when the number of turns of the coil pattern, through which current flows in a different direction, is reduced, the magnitude of the offset electromagnetic force can be reduced. That is, the required strength of electromagnetic force may be obtained by changing the number of turns of each coil pattern according to the design of the coil pattern.

In the above, although a structure, in which a coil pattern, a via pad portion, or an external electrode portion is formed on the first base layer 210, has been described, it may be formed in a structure, in which a dummy pattern, a heat dissipation pattern, or an electromagnetic shielding pattern for maintaining plating balance or interlayer balance is included, or an external element such as a filter or a sensor is further included.

Meanwhile, as shown in FIG. 5, a third coil pattern 240 including a third pattern portion 241, third and fourth via pad portions 242 and 243, or an external electrode portion may be further formed on the back surface of the first base layer 210 as well.

In FIG. 5, the coil patterns 220, 230, and 240 formed on the front/back surface of the first base layer 210 may be electrically connected to each other by vias. For example, the first via pad portion 222 formed at one end of the first coil pattern 220 and the second coil pattern 230 and the third via pad portion 242 formed at one end of the third coil pattern 240 may be connected by the first via 225, and the fourth via pad portion 243 formed at the other end of the third coil pattern 240 may be electrically connected to the second external electrode portion (or the second via pad portion) on the front surface of the first base layer 210 by the second via 245. In the present disclosure, an example, in which three coil patterns are formed on the front/back surface of one coil substrate 200, respectively, has been described, but the present disclosure is not limited thereto, and a plurality of coil patterns may be further formed.

That is, since the first external electrode portion 223 formed at the other ends of the first coil pattern 220 and the second coil pattern 230 and the second external electrode portion 232 connected to the third coil pattern 240 are formed on the same surface, the electromagnetic force can be strengthened while improving the degree of freedom of the circuit. In addition, in the prior art, as one surface of the base layer and the coil pattern are formed in a one-to-one correspondence, three surfaces of the base layer are required to form three coil patterns, and as a result, two or more base layers have to be stacked. However, in the present disclosure, since the coil pattern can be formed in a one-to-many correspondence with respect to one surface of the base layer, it is possible to provide a coil substrate satisfying the conventional electromagnetic force with one base layer without adding a separate stacking process.

Meanwhile, in the present disclosure, a plurality of coil substrates 200 may be provided, stacked by interlayer insulating layers formed between each coil substrate, and electrically connected by vias formed in the interlayer insulating layers. The interlayer insulating layer is a resin layer composed of an insulating material. The interlayer insulating layer may be formed using the same polymer material as that of the first base layer 210. Alternatively, it may be formed by being stacked with a coil substrate having a coil pattern formed on a separate base layer.

As an example, a first interlayer insulating layer (not shown) may be formed under the back surface of the first coil substrate, and a fourth coil pattern 420 may be formed under the first interlayer insulating layer. As will be described later, the fourth coil pattern 420 may be formed simultaneously with the first and second coil patterns 220 and 230. Alternatively, a second coil substrate including the fourth coil pattern 420 may be further formed. That is, the fourth coil pattern 420 may be formed on the first interlayer insulating layer, but may also be formed on the second base layer 410 of the second coil substrate. In addition, when the second coil substrate is further formed, a single or a plurality of coil patterns other than the fourth coil pattern 420 may be further formed on the second base layer 410, but in the present disclosure, an example, in which one coil pattern, that is, the fourth coil pattern 420 is formed on one surface of the second base layer 410, will be described.

The following description refers to FIG. 6.

The first coil pattern 220, in which the first external electrode portion 223 is formed at the other end, may be electrically connected to the third coil pattern 240 through the first via 225, and may be electrically connected to the second coil pattern 230 through the second via 245 connected to the other end of the third coil pattern 240. One end of the second coil pattern 230 is connected to the first via pad portion 222 of the first coil pattern 220, so that it may be electrically connected to the fifth via pad portion 422 of the fourth coil pattern 420 through the third via 425 passing through the first base layer 210 and the second base layer 410 of the first coil substrate 200. In addition, the sixth via pad portion 423 formed at the other end of the fourth coil pattern 420 may be electrically connected to the second base layer 410 of the second coil substrate 400, or the second external electrode portion 232 formed on the front surface of the first base layer 210 of the first coil substrate 200 through the fourth via 426 passing through the second base layer 410 and the first base layer 210 of the first coil substrate 200. That is, even in this embodiment, since the first external electrode portion and the second external electrode portion are formed on the same surface while the respective coil patterns are electrically connected to each other, the degree of circuit freedom can be improved.

In addition, current in the same direction may be applied to the coil patterns respectively formed on the first coil substrate 200 and the second coil substrate in the above to provide a strong electromagnetic force. Alternatively, the present disclosure is not limited thereto, and the current may be applied to each coil substrate or some coil patterns in a different direction.

Meanwhile, the number of turns of the coil patterns formed on the first coil substrate 200 and the coil patterns formed on the second coil substrate may be the same or different. For example, the number of turns of the first coil pattern 210 and the second coil pattern 230 formed on the front surface of the first coil substrate 200 may be each 8, and the number of turns of the third coil pattern 240 formed on the back surface and the number of turns of the fourth coil pattern 420 formed on the second coil substrate may be each 10. In this case, a total of 36 turns is provided as the number of by four coil patterns, but actual coil patterns may be formed in three layers. That is, while the number of turns of the entire coil pattern is maintained in consideration of electromagnetic force, resistance characteristics, inductance, etc. of the coil substrate, the number of layers can be reduced, thereby improving production efficiency.

Accordingly, the coil apparatus according to the present disclosure can effectively generate the flow of current that induces electromagnetic force through the electrical connection relationship between the first coil substrate 200 and the second coil substrate. In addition, the coil apparatus 200 places both the first external electrode 223 and the second external electrode 232 on the front surface of the first base layer 210 of the first coil substrate 200 to facilitate connection with an external power supply, and accordingly, the effect of improving the degree of freedom of the circuit can be obtained. In addition, it is possible to increase the electromagnetic force while reducing the number of layers, thereby improving production efficiency.

However, embodiments of the present disclosure are not limited to the structures shown in FIGS. 3 to 6. Although FIG. 3 illustrates an example of a structure, in which the first coil substrate 200 is formed on the uppermost layer, the first coil substrate 200 may be formed on the intermediate layer or the lowermost layer. For example, when the first coil substrate 200 is located in the intermediate layer, the third and fourth coil patterns may be respectively formed on upper and lower sides of the first base layer, in which the first and second coil patterns are formed. In this case, the first external electrode portion 223 may be directly connected to an external electrode (not shown) or may be indirectly connected to the external electrode by an nth external electrode portion (n is a natural number equal to or greater than 3) or an mth via (m is a natural number equal to or greater than 4) formed on the same surface as the third and fourth coil patterns. In addition, the external electrode is located in the uppermost layer or the lowermost layer and may be formed on one surface of the base layer including the coil pattern or on one surface of the base layer not including the coil pattern. Accordingly, the present disclosure can include all of the above-described effects while easily modifying the position of the base layer, in which the coil pattern is multi-wound, according to the internal structure of the electronic device including the coil substrate.

Figure 7:
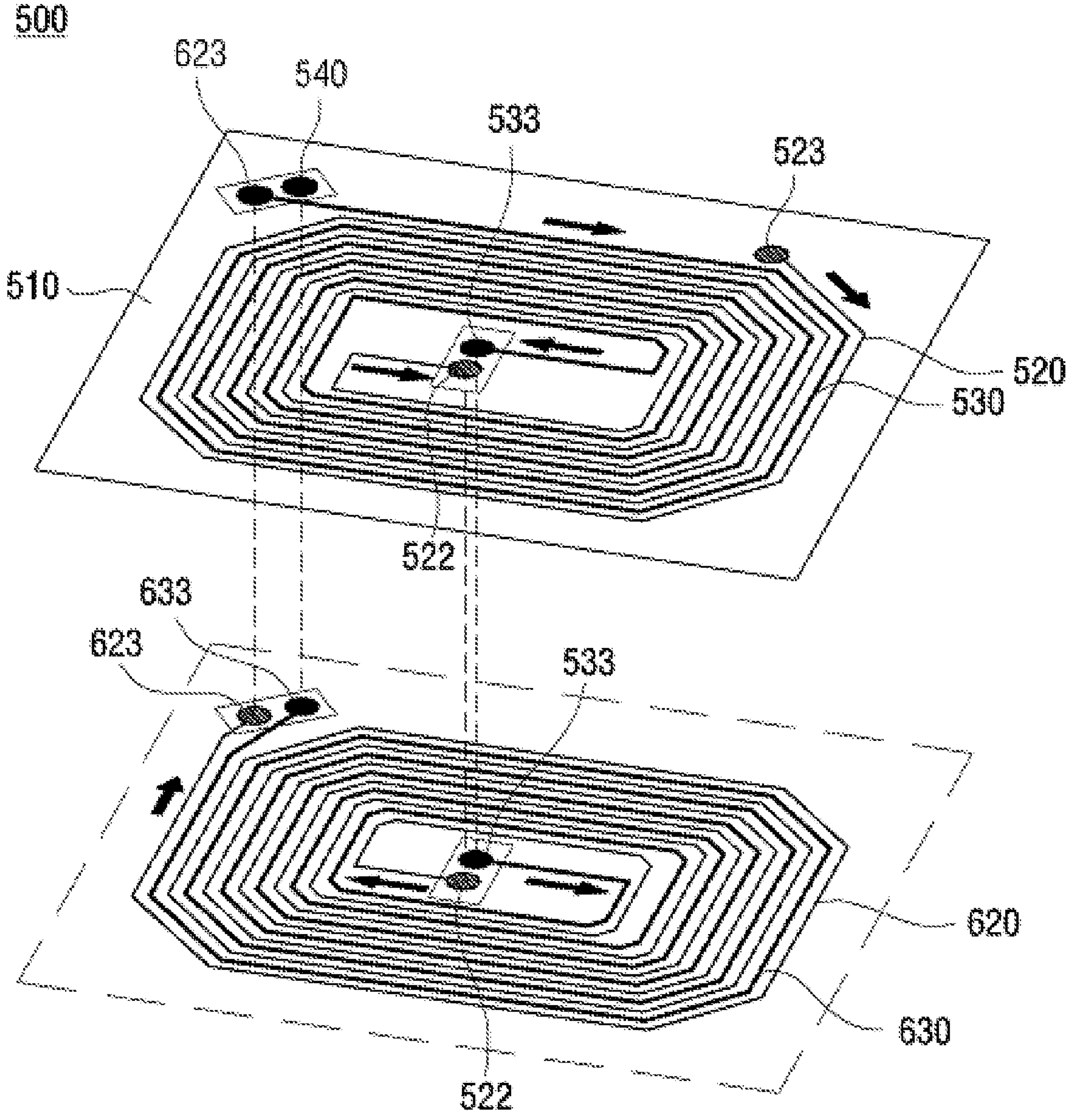
FIG. 7 is an exploded perspective view illustrating a coil pattern constituting a coil substrate according to another embodiment of the present disclosure.

FIG. 7 is an exploded perspective view illustrating a coil pattern constituting a coil substrate according to another embodiment of the present disclosure. The coil substrate 500 may be configured to include two coil patterns on the front/back surface of the base layer 510, respectively, and the coil patterns on the front surface will be referred to as the fifth coil pattern 520 and the sixth coil pattern 530, and the coil patterns on the back surface will be referred to as a seventh coil pattern 620 and an eighth coil pattern 630, respectively.

When a current is applied from the third external electrode portion 523 formed at one end of the fifth coil pattern 520, it may be connected to the eighth via pad portion 522 of one end of the seventh coil pattern 620 through the fifth via 522 of the seventh via pad portion formed at the other end, and may be connected to one end of the sixth coil pattern 530 through the sixth via 623 of the ninth via pad portion at the other end. In addition, it may be connected to the eighth via pad portion 622 of one end of the eighth coil pattern 630 through the seventh via 533 of the seventh via pad portion connected to the other end of the sixth coil pattern 530, and it may be connected to the fourth external electrode portion 540 through the tenth via 633 of the ninth via pad portion of the other end. That is, by forming four coils on one base layer, high electromagnetic force can be secured, and an external electrode can be located on one surface of the base layer of the same layer.

Meanwhile, although not shown, it may be directly or indirectly connected to an external electrode formed in an interlayer insulating layer or a separate base layer according to an internal structure of the electronic device including the coil substrate 500.

The present disclosure is not limited thereto, and a separate coil substrate may be further formed on the upper or lower portion of the coil substrate 500, in which four coils are formed, and the separate coil substrate may have a structure, in which a coil pattern is formed in a single winding or multiple winding type.

Meanwhile, although not shown, the coil substrate according to the present disclosure may further include a protective layer formed to protect the coil pattern. The protective layer is formed to cover an upper portion of the coil pattern, and may be formed on the coil pattern after the resist pattern layer is removed from the base layer.

The protective layer is made of an insulating material, and for example, the protective layer may be formed on the coil pattern by using a solder resist as a material. The protective layer may be formed using a method such as printing, coating, or photolithography.

Next, a method of manufacturing the coil device 200 according to an embodiment of the present disclosure will be described.

First, the first base layer 210 is prepared.

Thereafter, a coil pattern is formed on the first base layer 210. In this step, it is also possible to form a coil pattern on only one surface of the first base layer 210 or to form coil patterns on both surfaces at the same time. As an example, it is formed by winding the first coil pattern 220 and the second coil pattern 230 on one surface of the base layer in a helical structure. When the first and second coil patterns 220 and 230 are formed on the first base layer 210, after the resist pattern layer is formed on the first base layer 210, the first and second coil patterns 220 and 230 may be formed in the opening where the resist pattern layer is not formed. In this case, the resist pattern layer may be formed on the first base layer 210 by using a method such as printing, lamination, or photolithography, and the first coil pattern 220 may be formed on the first base layer 210 by using an electrolytic plating technique. In addition, the first and second coil patterns 220 and 230 are formed so that the pattern portion, the via pad portion or the external electrode portion included in each coil pattern do not overlap with each other, in particular, the continuous line-shaped pattern portion may be formed in a double winding structure, in which the pattern portions are wound spaced apart from each other in parallel.

In addition, when the third coil pattern 240 is formed on the back surface of the first base layer 210, the same technique as the first and second coil patterns 220 and 230 may be used. However, the present disclosure is not limited thereto, and it may be formed in a different manner from the coil patterns of the front surface, and it may be formed simultaneously or sequentially with the first and second coil patterns 220 and 230.

In addition, a single or a plurality of vias may be further formed in the first base layer 210 so that the first and second coil patterns 220 and 230 and the third coil pattern 240 are electrically connected, and they may be formed by filling a conductive material in the form of a paste or using an electroless or electrolytic plating technique.

Thereafter, a protective layer is formed on each coil pattern. When the protective layer 250 is formed, after the resist pattern layer is removed, it may be formed using a method such as printing, lamination, or photolithography to cover the coil pattern.

Next, a method of manufacturing a coil apparatus according to another embodiment of the present disclosure will be described.

First and second coil patterns 220 and 230 are formed on one surface of the first base layer 210 of the prepared first coil substrate 200, and a third coil pattern 240 is formed on the back surface.

A protective layer 250 is formed to cover the third coil pattern 240. A via is formed in the protective layer 250 to be connected to a second coil substrate 400 to be described later.

A second base layer 410 of the second coil substrate 400 is prepared, and a hole, in which a via connecting to the first coil substrate 200 is formed, is provided.

A fourth coil pattern 420 is formed on one surface of the second base layer 410 of the second coil substrate 400 and, at the same time, a via is formed by filling a hole formed in the second base layer 410 with a conductive material.

Thereafter, a protective layer is formed to cover the fourth coil pattern 420.

The protective layers 250 covering the back surface of the second base layer 410 of the second coil substrate 400 and the third coil pattern 240 of the first coil substrate 200 are bonded to each other. In this case, as the bonding method, a hot press method, a rolling method, or the like may be used.

As another embodiment according to the present disclosure, a coil apparatus may be configured by stacking a plurality of coil substrates having a coil pattern formed on only one surface of the base layer.

As another method, a coil substrate, in which two coil patterns are formed in a double winding structure on one surface of the base layer, is prepared. A protective layer or an interlayer insulating layer is formed to cover the coil pattern. A hole is formed in the protective layer or the interlayer insulating layer. Thereafter, a coil pattern may be formed on the upper surface of the protective layer or the interlayer insulating layer and the back surface of the base layer, and at the same time, the via may be formed by filling the hole.

Although the embodiments of the present disclosure have been described with reference to the above and the accompanying drawings, those of ordinary skill in the art to which the present invention pertains can understand that the present disclosure can be practiced in other specific forms without changing the technical spirit or essential features. Therefore, it should be understood that the embodiments described above are illustrative in all respects and not limiting.

The present disclosure can be applied to a thin-film coil apparatus. In addition, the present disclosure can be applied not only to electronic parts such as inductors, capacitors, and actuators, but also to small electronic products such as smartphones and digital cameras, and various electronic devices such as vibration motors, speakers, and antennas.

What is claimed is:

1. A coil apparatus comprising:

at least one coil substrate, wherein the coil substrate comprising:

a base layer; and a coil pattern formed on the base layer and including a pattern portion, a via portion part and an external electrode portion, wherein the coil substrate is wound in a multi-helical structure in response to a plurality of coil patterns being provided, wherein each coil pattern is electrically connected to each other, all of coil patterns are connected by two external electrode parts which are formed on the same surface, wherein, in response to a first coil pattern and a second coil pattern being formed on the base layer, a pattern portion of the second coil pattern is spaced parallel to an inside of a pattern portion of the first coil pattern and wound side by side to form a double-helical structure, wherein a third coil pattern including a pattern portion, a via pad portion or an external electrode portion is further formed on a back surface of the base layer, and wherein one end of the third coil pattern and the other end of are electrically connected through different coil patterns and vias on a front surface of the base layer.

2. The coil apparatus of claim 1, wherein all of the plurality of coil patterns are wound in the same number of turns or at least one different number of turns.

3. The coil apparatus of claim 1, wherein current flows in all of the plurality of coil patterns in the same direction, or current flows in one or more of the plurality of coil patterns in a different direction.

4. The coil apparatus of claim 1, wherein the via comprises a first via or a second via, wherein the first via electrically connects the first coil pattern and the third coil pattern, and the second via electrically connects the second coil pattern and the third coil pattern.

5. The coil apparatus of claim 1, wherein a plurality of external electrode portions are formed on the same layer.

6. A coil apparatus comprising:

at least one coil substrate, wherein the coil substrate comprising:

a base layer; and a coil pattern formed on the base layer and including a pattern portion, a via portion part and an external electrode portion, wherein the coil substrate is wound in a multi-helical structure in response to a plurality of coil patterns being provided, wherein each coil pattern is electrically connected to each other, all of coil patterns are connected by two external electrode parts which are formed on the same surface, wherein a plurality of coil substrates are provided and stacked by an interlayer insulating layer or a protective layer formed between the respective coil substrates, wherein the plurality of coil substrates are electrically connected to each other by a plurality of vias formed in the interlayer insulating layer or the protective layer, wherein the plurality of coil substrates comprise a first coil substrate and a second coil substrate, wherein a fourth coil pattern is formed on the second coil substrate, wherein the plurality of vias comprise a third via or a fourth via, and wherein the third via connects the fourth coil pattern and a second coil pattern of the first coil substrate, and the fourth via connects the fourth coil pattern and an external connection portion of the first coil substrate.

7. The coil apparatus of claim 6, wherein the third via or the fourth via is formed passing through two or more interlayer insulating layers, protective layers, or base layers.

* * * * *